Jan. 14, 1958 G. A. DILGARD 2,819,509
ARTIFICIAL STONE MOLDING MACHINE
Filed Jan. 28, 1955 2 Sheets-Sheet 1
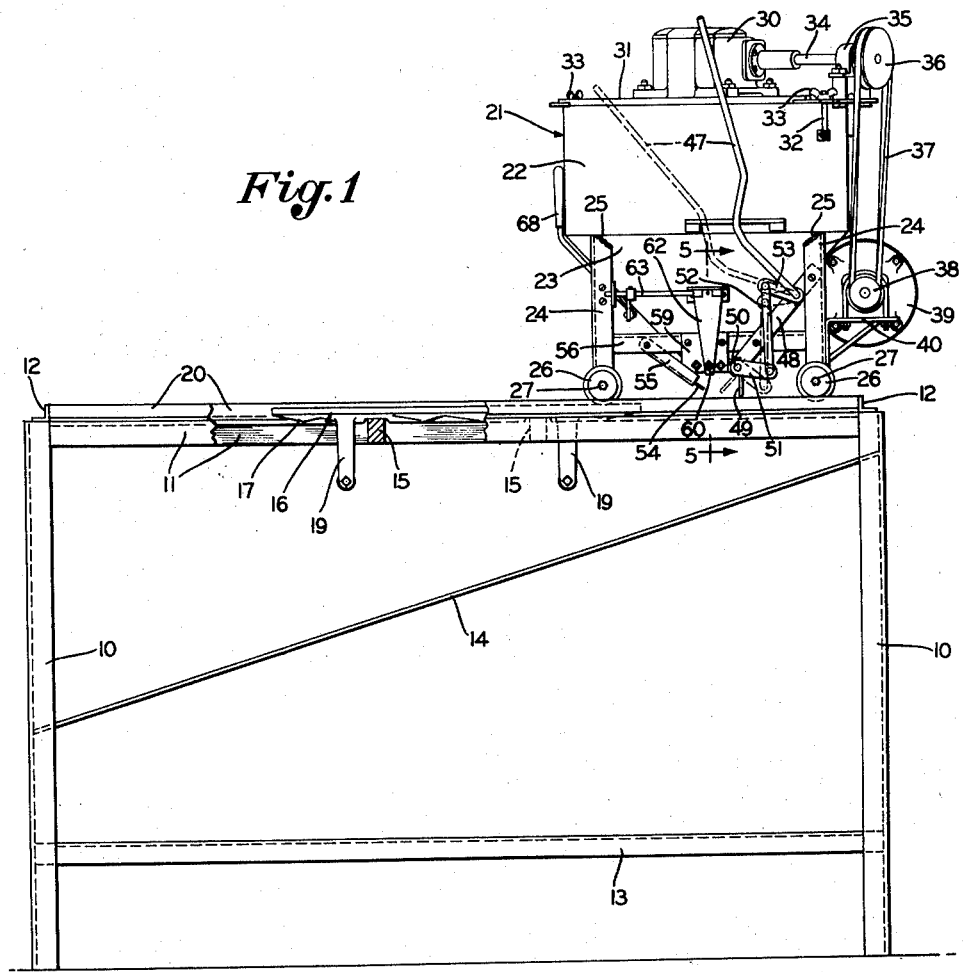
Fig.1
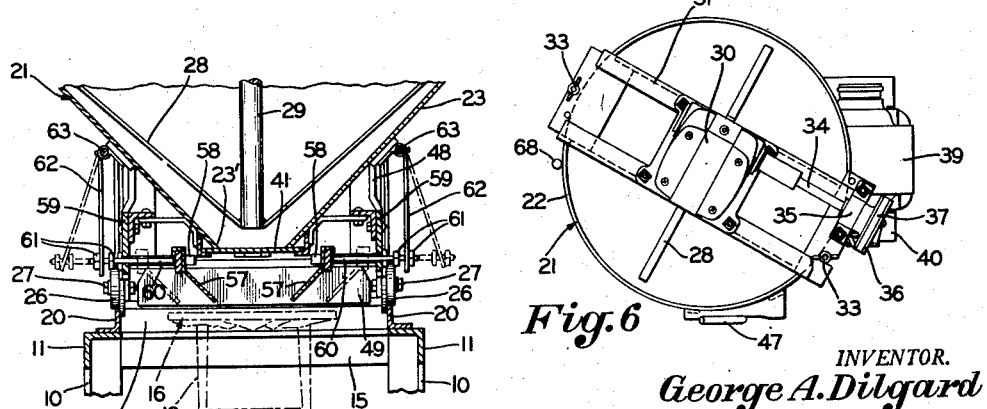
Fig. 5
Fig. 6
INVENTOR.
George A. Dilgard
BY
Frease & Bishop
ATTORNEYS Jan. 14, 1958  G. A. DILGARD  2,819,509
ARTIFICIAL STONE MOLDING MACHINE
Filed Jan. 28, 1955  2 Sheets-Sheet 2

INVENTOR.
George A. Dilgard
BY
Frease & Bishop
ATTORNEYS

United States Patent Office 2,819,509
Patented Jan. 14, 1958

2,819,509

ARTIFICIAL STONE MOLDING MACHINE

George A. Dilgard, Ashland, Ohio

Application January 28, 1955, Serial No. 484,713

6 Claims. (Cl. 25—42)

The invention relates to molding machines and more particularly to a machine for molding artificial stone. The machine is particularly adapted for use in applying a simulated stone wall finish to the exterior of a building formed of brick or the like.

This is accomplished by applying a scratch coat of mortar to the surfaces of the wall, after which substantially shallow molds, simulating natural stone, are filled with a concrete mixture such as hydraulic cement and an aggregate with sufficient water, the open side of the mold being then pressed against the scratch coat upon the wall so as to cause the wet concrete mixture to adhere thereto, after which the mold is removed.

For the purpose of preventing the concrete from adhering to the mold, a sheet of wax paper or the like is first placed in the mold, and if it is desired to color the artificial stone, powdered metallic salts or the like are sprinkled upon the sheet of wax paper, after which the concrete mixture is placed in the mold, preferably extending above the open side of the mold.

Under present practice the concrete mixture is manually placed in the mold with a trowel. This is not only a slow and costly operation, but it is difficult to manually strike off the surface of the cement mixture.

The object of the present improvement is to provide a machine for quickly and easily filling such molds with cement, and uniformly striking off the surface of the cement, after which the filled mold may be immediately removed from the machine and the artificial stone slab thus molded may be applied to the wall in conventional manner.

Another object is to provide such an apparatus comprising a base for supporting a mold in position to be filled and a hopper movable over the base for discharging a concrete mixture into the mold.

A further object is to provide such an apparatus including an inverted, conical hopper having a discharge outlet at its lower end and a shut-off valve controlling the outlet.

A still further object is to provide such a device in which a downwardly and inwardly inclined deflector plate is located beneath, and slightly forward of the discharge outlet, and a pivoted plate is located slightly below and to the rear of the discharge outlet, means being provided for tilting said pivoted plate to downwardly and forwardly inclined position to and from a deflector plate during the filling operation of the mold and for swinging said plate to substantially vertical position to provide a strike-off plate for uniformly smoothing off the top surface of the concrete after it has been poured into the mold.

Another object of the invention is to provide means for simultaneously closing the shut-off valve and tilting said pivoted plate to vertical or strike-off position.

A further object is to provide laterally disposed downwardly and inwardly inclined deflector plates and means for adjusting the same to accommodate molds of various widths.

The above objects together with others which will be apparent from the drawings and following description, or which may be later referred to, may be attained by constructing the improved molding machine in the manner hereinafter described in detail and illustrated in the accompanying drawings.

In general terms, the invention may be stated as comprising a base having means thereon for supporting a mold to be filled, and longitudinally disposed rails at opposite sides of the base, an inclined chute in the base below the mold for discharging any particles of the concrete mixture which may drop from the mold, a conical hopper having wheels mounted upon said rails, an agitator within the hopper for mixing cement, aggregate and water, a discharge outlet in the bottom of the hopper, a downwardly and rearwardly inclined deflector plate below and slightly forward of the hopper, a pivoted plate below and slightly to the rear of the hopper and means for simultaneously operating the shut-off valve and said pivoted plate so that when the shut-off valve is opened the pivoted plate forms a downwardly and forwardly inclined deflector plate and when the shut-off valve is closed the pivoted plate forms a substantially vertical strike-off plate, a pair of laterally disposed, downwardly and inwardly inclined deflector plates with means for simultaneously adjusting the same toward or from the center to accommodate molds of various widths, a motor upon the hopper and means operatively connecting the motor to the agitator in the hopper.

An embodiment of the invention thus set forth in general terms is illustrated in the accompanying drawings, in which:

Fig. 1 is a side elevation, partly in section, of the improved molding machine;

Fig. 2 an enlarged, fragmentary, sectional view of the lower portion of the hopper and the upper portion of the base, showing a mold supported upon the base in position to be filled, the shut-off valve being open and the pivoted plate being located in inwardly and downwardly inclined position for discharging the concrete mixture from the hopper into the mold;

Figure 2:
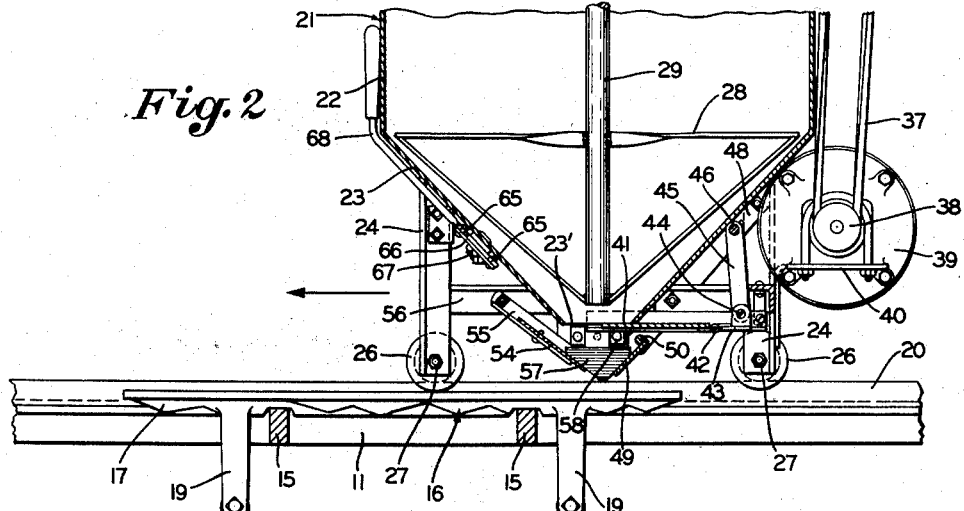

Fig. 5 an enlarged transverse sectional view, taken as on the line 5—5, Fig. 1; and, Fig. 6 is a top plan view of the hopper.

Referring now more particularly to the construction shown in the drawings, in which similar reference characters refer to similar parts throughout, the artificial stone molding machine to which the invention pertains includes a base comprising the corner uprights 10, which may be in the form of angle irons as shown, and having a rectangular frame attached to their upper ends comprising the longitudinally disposed members 11 and the transversely disposed members 12, both of which may be in the form of angle irons or similar structural members. The uprights 10 are connected near their lower ends with the horizontally disposed brace members 13 so as to provide a rigid base construction.

A downwardly and forwardly inclined bin or chute 14 extends longitudinally through the base, beneath the upper frame members 11 and 12, and is connected at opposite ends to the corner uprights 10. This chute is provided for a purpose to be later explained in detail.

Transversely disposed supporting bars 15 are attached at spaced points to the intermediate portions of the longitudinal top frame member 11 for the purpose of supporting the artificial stone molds 16.

These molds are of conventional construction, such as are now commonly used for providing a facing simulating natural stone upon the exterior of a brick wall or the like, and it should be understood that the invention does not reside in these molds per se, but only in the novel apparatus for filling the molds with a concrete mixture or the like so that the same may be applied to a wall.

Such molds are relatively shallow, having the bottom wall 17 shaped to simulate a natural stone surface and being open at the upper side as at 18. One or more handles 19 are provided upon the closed bottom or rear side of the mold for permitting manual manipulation thereof to transfer the contents of the mold to the surface of a wall in conventional manner.

Longitudinally disposed, spaced rail members 20, which may be in the form of angle irons, as shown in Fig. 5, are attached to the top of the base providing means for longitudinally moving the hopper thereover as will be later described.

The hopper, indicated generally at 21, comprises the upper cylindrical portion 22 and the lower inverted conical portion 23 terminating at its lower end in the discharge outlet 23'. The hopper 21 is supported upon four spaced upright legs 24 which may be in the form of angle irons or the like, the upper ends of which are cut off at an angle and welded to the hopper, as indicated at 25, the wheels 26 being journalled upon the lower portions of these legs as at 27 for contact with the rails 20 upon the base.

An agitator 28, of any suitable design, is located within the lower portion of the hopper, being attached to the rotatable vertical shaft 29. The upper end of the shaft 29 is connected to a conventional gear reduction located within the housing 30 which is centrally supported at the top of the hopper by means of the diametrically disposed bracket 31 detachably clamped upon the top of the hopper as by the hinged bolts 32 and thumb nuts 33.

A horizontal shaft 34, connected to the reduction gearing, is journalled at its outer end in a bearing 35 upon the bracket 31 and a V-pulley 36 is fixed to the outer end of said shaft and operatively connected, as by the V-belt 37, with the pulley 38 upon the shaft of the motor 39 mounted upon a supporting bracket 40 connected to one pair of the supporting legs 24.

Thus it will be apparent that when the motor 39 is operated, the agitator 28 will be rotated at proper speed through the reduction gearing and the belt and pulley connection thereof to the motor. With the agitator operating continuously during operation of the machine the cement, aggregate and water mixture within the hopper will be thoroughly intermixed.

A horizontally slidable shut-off valve 41 is provided for controlling the discharge outlet 23' of the hopper. This valve is shown as in the form of a flat plate, the outer end of which is pivotally connected as at 42 to a link 43 pivotally connected as at 44 to the lower end of the lever arm 45.

The upper end of the lever 45 is fixed to the angular lower end 46 of the operating lever 47. This angular portion 46 of the operating lever is journalled in a bracket plate 48 fixed to the exterior of the conical portion 23 of the hopper.

Figure 3:
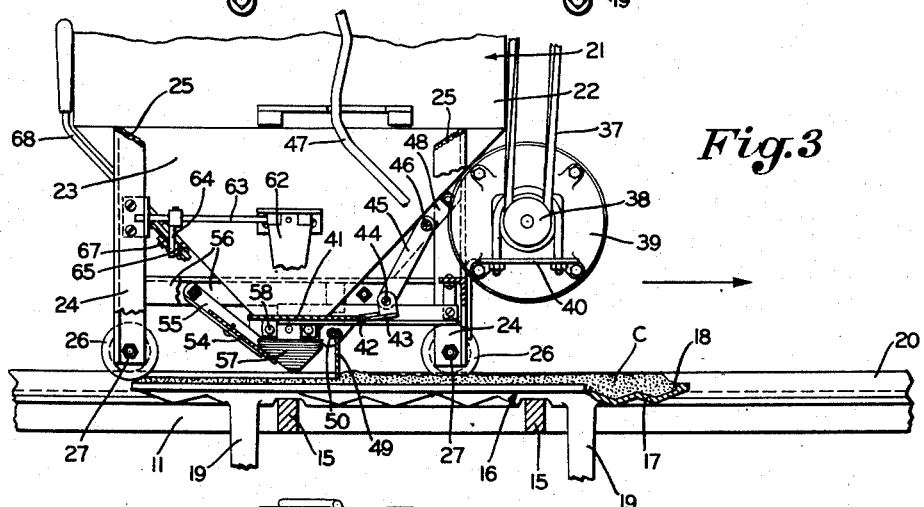
Fig. 3 is a similar view showing the mold filled with concrete, the shut-off valve of the hopper being closed and the pivoted plate being in vertical position serving as a strike-off plate to smooth the surface of the concrete mixture.
Figure 4:
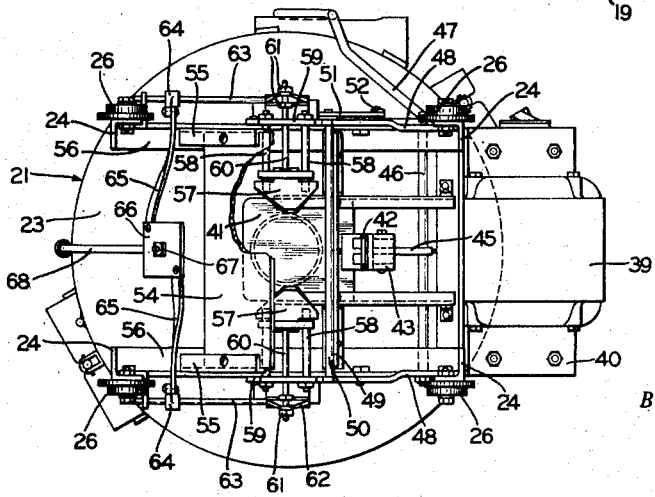
Fig. 4 is a bottom plan view of the hopper.

With the operating lever 47 in the raised position, as shown in full lines in Fig. 1, the shut-off valve 41 will be in closed position as shown in Fig. 3, and with the operating lever 47 in the lowered position as shown in broken lines in Fig. 1, the shut-off valve 41 will be in open position as shown in Fig. 2, so that the concrete mixture may be discharged from the hopper through the ouetlet 23'.

A combined deflector and strike-off plate 49 is pivotally mounted at opposite ends in the lower end portion of the bracket plates 48 as indicated at 50. For the purpose of operating the plate 49 simultaneously with the shut-off valve 41, a lever 51 is fixed to the pivotal point 50 of the plate 49, the outer end of the lever being pivotally connected to the lower end of the link 52, the upper end of said link being pivotally connected to a lever 53 fixed to the journalled end portion 46 of the operating lever 47.

Thus, when the operating lever 47 is in the full line position as shown in Fig. 1, with the shut-off valve 41 closed the plate 49 is in vertical position forming a strike-off plate as shown in Fig. 3, and when the operating lever 47 is in the lowered or broken line position of Fig. 1, with the shut-off valve 41 in open position, the plate 49 is in inwardly and downwardly inclined position, as shown in Fig. 2, forming a deflector plate for deflecting the cement material downwardly and forwardly toward the mold as it is discharged from the hopper.

A stationary, downwardly and rearwardly inclined deflector plate 54 is mounted below and forwardly of the discharge outlet 24, to cooperate with the plate 49 in directing the cement mixture into the mold.

The deflector plate 54 is rigidly mounted upon the brackets 55 which extend downwardly and rearwardly from the horizontal brace members 56 connected to the lower portions of the legs 24.

In order to confine the cement mixture laterally relative to the mold, a pair of downwardly and inwardly inclined deflector plates 57 are mounted for transverse adjustment so as to compensate for molds of different widths. Each of these deflector plates 57 is slidably mounted upon a pair of guide bars 58 carried by bracket plates 59 depending from opposite sides of the hopper.

A rod 60 is fixed to each side of the lateral deflector plate 57 and slidably mounted through the corresponding bracket plate 59, a spaced pair of shoulders 61 being fixed upon the outer end portion of each rod 60 to receive the slotted lower end of a lever 62, the upper end of which is fixed upon a rocket shaft 63. A rocker arm 64 is fixed upon each rocker shaft 63, the rocker arms being connected by links 65 to the plate 66 which is pivoted at 67 upon the exterior of the hopper and adapted to be rotated by the operating lever 68 to adjustably move the lateral deflector plates 57 upon the guide rods 58.

In the operation of the machine to mold artificial stone, a mold 16 is placed in position upon the cross members 15 of the base as shown in Figs. 1, 2 and 3. A sheet of wax paper or the like is then placed in the bottom of the mold, and if desired any conventional coloring powder may be sprinkled thereon.

With the hopper at the right hand end of the base, as viewed in Fig. 1, and the operating lever 47 in raised or full line position, as shown in said figure, the shut-off valve 41 is in closed position and the combined deflector and strike-off plate 49 is in vertical position, as best shown in Fig. 3.

Proper amounts of hydraulic cement, aggregate and water are placed in the hopper 21 and the motor 39 is started, rotating the agitator 28 to thoroughly mix the ingredients. The hopper is then moved to the left as viewed in Fig. 1, to a position locating the discharge outlet thereof over the right hand end of the mold 16, at which point the operating lever 47 is moved to the broken line position shown in Fig. 1, opening the shut-off valve and swinging the plate 49 to the forwardly and downwardly inclined position shown in Fig. 2, forming a deflector plate.

The cement mixture is thus discharged through the outlet 23' and by means of the deflector plates 49 and 54 and the lateral deflector plates 57 the mixture is discharged into the open upper side of the mold 16. As the movement of the hopper 21 to the left is continued, the cement mixture is discharged into the mold 16 throughout its length filling the mold as indicated at C in Fig. 3.

It is preferable that the cement mixture extend a slight distance above the open top of the mold, as shown in Fig. 3. In order that this top surface of the cement mixture in the mold may be smoothed uniformly throughout the length of the mold, the operating lever 47 is thrown to the raised position when the discharge outlet of the hopper reaches a point above the left hand end of the mold, as viewed in Figs. 1 to 3.

At this point the hopper is moved to the right with the shut-off valve 41 in closed position and the strike-off plate 49 in vertical position, as shown in Fig. 3, striking off surplus cement and forming a flat smooth surface thereon, as shown in Fig. 3.

Any cement which is thus struck off will drop upon the chute 14 and be carried downwardly and to the left thereon by gravity, and may be deposited in any suitable receptacle placed at the left hand end of the base for this purpose.

From the above it will be obvious that a simple, efficient, and easily operated machine is provided for quickly, easily and uniformly filling the molds for forming a simulated stone surface upon a wall in the manner above referred to.

As each mold is filled it is removed from the machine and the open side of the mold is placed against the surface of the wall in conventional manner so that the artificial stone slab in the mold will adhere to the wall.

The mold is then pulled away from the wall leaving the artificial stone slab thereon, and after the same has sufficiently hardened, the wax paper may be removed from the outer surface thereof.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A machine for molding cement slabs, comprising a base, mold support means on the base, rails upon the base, a hopper movable upon the rails, means for forming a cement mixture in the hopper, there being a discharge outlet in the hopper, a shut-off valve for the discharge outlet, a rearwardly inclined deflector plate located below and forwardly of the discharge outlet, a combined deflector and strike-off plate pivotally mounted below and rearwardly of the discharge outlet, and means for simultaneously opening the shut-off valve and swinging said pivoted plate to forwardly inclined deflecting position and for simultaneously closing the shut-off valve and swinging said pivoted plate rearwardly to vertical strike-off position.

2. A machine for molding cement slabs, comprising a base, mold support means on the base, rails upon the base, a hopper movable upon the rails, means for forming a cement mixture in the hopper, said means including a vertical shaft in the hopper, an agitator on the lower portion of the shaft, a reduction gearing upon the top of the hopper connected to the upper end of the shaft, a motor upon the hopper and means operatively connecting the motor to the reduction gearing, there being a discharge outlet in the hopper, a shut-off valve for the discharge outlet, a rearwardly inclined deflector plate located below and forwardly of the discharge outlet, a combined deflector and strike-off plate pivotally mounted below and rearwardly of the discharge outlet, and means for simultaneously opening the shut-off valve and swinging said pivoted plate to forwardly inclined deflecting position and for simultaneously closing the shut-off valve and swinging said pivoted plate rearwardly to vertical strike-off position.

3. A machine for molding cement slabs, comprising a base, mold support means on the base, rails upon the base, a hopper movable upon the rails, means for forming a cement mixture in the hopper, there being a discharge outlet in the hopper, a shut-off valve for the discharge outlet, a rigidly mounted downwardly and rearwardly inclined deflector plate located below the forward side of the discharge outlet, a pivotally mounted downwardly and forwardly inclined deflector plate located below the rear side of the discharge opening, means for simultaneously closing the shut-off valve and swinging said pivotally mounted plate to vertical position, a pair of downwardly and inwardly disposed deflector plates located below and laterally of the discharge outlet between said first named deflector plates, and means for simultaneously adjusting said last-named deflector plates toward and from each other.

4. A machine for molding cement slabs, comprising a base, mold support means on the base, rails upon the base, a hopper movable upon the rails, means for forming a cement mixture in the hopper, there being a discharge outlet in the hopper, a horizontally slidable shut-off valve for the discharge outlet, a rigidly mounted downwardly and rearwardly inclined deflector plate located below the forward side of the discharge outlet, a pivotally mounted downwardly and forwardly inclined deflector plate located below the rear side of the discharge opening, means operated by the closing of the shut-off valve for swinging said pivotally mounted plate to vertical position, a pair of downwardly and inwardly disposed deflector plates located below and laterally of the discharge outlet between said first named deflector plates, and means for simultaneously adjusting said last-named deflector plates toward and from each other.

5. A machine for molding cement slabs, comprising a base, mold support means on the base, rails upon the base, a hopper movable upon the rails, means for forming a cement mixture in the hopper, there being a discharge outlet in the hopper, a shut-off valve for the discharge outlet, a combined deflector and strike-off plate pivotally mounted below the discharge outlet, and means operated by the opening of the shut-off valve for swinging said pivotally mounted plate forward to inclined deflecting position, and by the closing of the shut-off valve for swinging said pivotally mounted plate rearwardly to vertical strike-off position.

6. A machine for molding cement slabs, comprising a base, mold support means on the base, rails upon the base, a hopper movable upon the rails, means for forming a cement mixture in the hopper, there being a discharge outlet in the hopper, a shut-off valve for the discharge outlet, a pair of downwardly and inwardly disposed deflector plates located below and laterally of the discharge outlet, laterally disposed guide rods upon which said deflector plates are slidably mounted, an operating rod attached to each deflector plate, a lever operatively connected to each operating rod, rocker shafts upon which said levers are fulcrumed, rocker arms upon said rocker shafts, a plate rotatably mounted upon the hopper, links connecting said rocker arms to said plate, and means for rotating said plate to adjust said deflector plates laterally toward and from each other.

References Cited in the file of this patent

UNITED STATES PATENTS

| | | |
|---|---|---|
| 1,769,530 | Miller | July 1, 1930 |
| 1,842,232 | Baker | Jan. 19, 1932 |
| 1,905,975 | Thomas | Apr. 25, 1933 |
| 2,004,936 | Dorn et al. | June 18, 1935 |
| 2,713,709 | Wright | July 26, 1955 |

FOREIGN PATENTS

| | | |
|---|---|---|
| 49,238 | Germany | Oct. 23, 1889 |